United States Patent [19]

Turkiyyah et al.

[11] Patent Number: 6,133,921
[45] Date of Patent: Oct. 17, 2000

[54] CONSTRUCTING SHAPE SKELETONS OF 3D OBJECTS USING GENERALIZED VORONOI DIAGRAMS

[75] Inventors: George M. Turkiyyah; Duane W. Storti, both of Seattle; Mark A. Ganter, Edmonds; Hao Chen, Seattle, all of Wash.

[73] Assignee: University of Washington, Seattle, Wash.

[21] Appl. No.: 08/862,217

[22] Filed: May 23, 1997

Related U.S. Application Data

[60] Provisional application No. 60/018,281, May 24, 1996, provisional application No. 60/018,278, May 24, 1996, provisional application No. 60/018,292, May 24, 1996, provisional application No. 60/018,280, May 24, 1996, provisional application No. 60/018,279, May 24, 1996, and provisional application No. 60/019,075, Jun. 3, 1996.

[51] Int. Cl.[7] .................................................. G06T 17/00
[52] U.S. Cl. .................................... 345/420; 345/441
[58] Field of Search ............................. 345/429, 420, 345/424, 441; 382/259

[56] References Cited

U.S. PATENT DOCUMENTS

| | | | |
|---|---|---|---|
| 4,933,889 | 6/1990 | Meshkat et al. | 364/578 |
| 5,522,019 | 5/1996 | Bala et al. | 345/424 |
| 5,542,036 | 7/1996 | Schroeder et al. | 345/424 |
| 5,559,935 | 9/1996 | Itoh et al. | 345/424 |
| 5,617,322 | 4/1997 | Yokota | 364/468.04 |
| 5,774,696 | 6/1998 | Akiyama | 395/500 |

OTHER PUBLICATIONS

Turner, J; Accurate Solid Modeling Using Polyhedral Approximations; IEEE Computer Graphics & Applications; pp. 14–28, 1988.

Herman, G. et al.; Shape–based Interpolation; IEEE Computer Graphics & Applications; pp. 69–79, May 1992.

Lavender, D. et al.; Voronoi Diagrams of Set–Theoretic Solid Models; IEEE Computer Graphics & Applications; pp. 69–77, Sep. 1992.

Zhou, J.M. et al.; Automatic Creation of 3D Meshes for Complicated Solids; IEEE Transactions on Magnetics, vol. 28, No. 2; pp. 1759–1762, Mar. 1992.

Sequeira, R. et al.; Disctrete Voronoi Diagrams and the SKIZ Operator: A Dynamic Algorithm; IEEE Transactions on Pattern Analysis and Machine Intellegence, vol. 19, No. 10; pp. 1165–1170, Oct. 1997.

Pai T.W., et al; Boundary–Constrained Morphological Skeleton Minimization and Skeleton Reconstruction; IEEE Transactions on Pattern Analysis and Machine Intelligence, vol. 16, No. 2; pp. 201–208, Feb. 1994.

*Primary Examiner*—Mark K. Zimmerman
*Assistant Examiner*—Albert K. Lee
*Attorney, Agent, or Firm*—Ronald M. Anderson

[57] ABSTRACT

Starting with a solid model of a 3D object, an accurate skeleton is produced by minimizing internal and edge errors of an initial approximate skeleton. To produce the initial approximate skeleton, the boundary of the solid is densely sampled to obtain a set of surface data points. Delaunay triangulation is performed on the surface data points and exterior and spurious tetrahedra are removed, leaving substantially interior tetrahedra. Circumspheres are constructed that enclose the tetrahedra, and the centers of the circumspheres are connected based on tetrahedra adjacency, to form a Voronoi diagram. Closed Voronoi cells are identified comprising the initial approximate skeleton. The position of skeleton interior vertices are then adjusted to minimize their error, producing a refined polygonal approximation of the skeleton interior geometry. Positions of the skeleton edge vertices are adjusted to minimize the edge error, yielding an accurate polygonal approximation of the skeleton.

18 Claims, 6 Drawing Sheets

CONSTRUCTING SHAPE SKELETONS OF 3D OBJECTS USING GENERALIZED VORONOI DIAGRAMS

RELATED APPLICATIONS

This application is, based on prior copending provisional applications, Ser. Nos. 60/018,281, 60/018,278, 60/018,292, 60/018,280, and 60/018,279, all of which were filed on May 24, 1996, and Ser. No. 60/019,075, filed Jun. 3, 1996, the benefit of the filing date of which is hereby claimed under 35 U.S.C. § 119(e).

FIELD OF THE INVENTION

The present invention generally relates to computer-aided modeling of objects, and more specifically, to the use of a computer for generating shape skeletons for objects described by solid models.

BACKGROUND OF THE INVENTION

Shape skeletons are powerful geometry abstractions that provide useful intermediate representations for a number of geometric operations on solid models, including feature recognition, shape decomposition, finite element mesh generation, and shape synthesis. In this context, the skeleton of an object consists of the closure of a locus of spheres that are maximally inscribable in the object so that points on the skeleton are minimally equidistant from at least two points on the boundary of the object. Skeletons of solids generically comprise a collection of two-dimensional (2D) surface patches, but can also contain one-dimensional (1D) curve components (or even zero dimensional points, if the object is composed of disjoint spheres).

The skeleton concept was formally introduced by H. A. Blum as a tool for shape description (described in "A Transformation for Extracting New Descriptors of Shape," *Models for the Perception of Speech and Visual Form,* ed. W. Wathen-Dunn, MIT Press, 1967, pp. 362–381) and has since been extended to three dimensions by others. The mathematical properties of skeletons and some of their curvature properties are known in the art. The importance of skeletons for the applications mentioned above has led to an extensive body of related literature describing algorithms and implementations for skeleton generation.

The techniques for generating skeletons can be classified into five categories. The first category includes algorithms that employ the exact mathematical description of the object without relying on discretization of either the object or the embedding space. The prior art discusses 2D and 3D algorithms for continuous skeleton generation. For example, one such reference presents a skeleton generation method for convex polyhedra. While these methods are appealing because they produce exact skeletal curves and surfaces, the algebraic manipulations involved for computing geometric intersections currently limit their applicability to low degree curves and surfaces.

The second category involves discretization of the space in which an object for which a skeleton is being constructed lies, using quadtrees, octrees, etc., and employs thinning procedures for the skeleton generation. This approach has become popularized by the computer vision community because of the discrete image input typical of vision processing. While space discretization is very effective in 2D applications, the size of the 3D grids required for non-trivial solids becomes prohibitive. U.S. Pat. No. 5,390,291 discloses how skeletons are applied for shape interpolation in a voxel based setting, but the skeletons are computed for 2D image data (using a thinning algorithm) and not for the 3D voxel description of a solid.

The third category involves tracing algorithms to traverse skeleton curves. This approach is effective for general 2D objects and 3D polyhedra, but extensions to non-polyhedral objects have not appeared in the prior art.

The fourth category involves transforming skeleton generation into the numerical solution of variational problems or PDEs to track the propagation of a moving front. Specific prior art approaches include the use of active contours (or snakes) and modified eikonal equations. Although these methods can exploit sophisticated numerical techniques, the computational requirements exceed current hardware capabilities for non-trivial 3D objects.

The fifth category employs discretization or sampling of the object's boundary and uses Voronoi diagrams as the basis for skeleton generation. These discretization methods produce a polygonal approximation that converges to the skeleton as the sampling becomes very dense, but the convergence is slow, especially near the edge of the skeleton of an object bounded by curved surfaces.

From the foregoing discussion, it will be apparent that a more efficient, accurate technique for producing skeletons would be useful in modeling objects. Of the five approaches discussed above, a variation of the fifth appears to offer the desired effectiveness. Details of this technique are discussed by Munikumar S. Vimawala in a Master's Thesis entitled, "Computational Procedures for Topological Shape Design," which was published in 1994. However, a more accurate determination of the skeleton of 3D objects is required than is disclosed in this prior art reference, since the disclosed approach produces only approximate skeletons having significant errors.

SUMMARY OF THE INVENTION

In accordance with the present invention, a polygonal approximation to the skeleton of an object with a piecewise curvature continuous boundary is created. The invention involves adjustment steps to improve the accuracy of the approximate skeleton, and the accuracy improvement is especially significant near the edge of the skeleton. More specifically, a method is defined for using a computer to construct a skeleton representing an object, where the object is defined by boundary data that represent a surface of the object. The method includes the step of producing simplices having vertices at surface data points that sample a boundary of the object. Circumspheres comprising hyperspheres are constructed so as to circumscribe the simplices. Centers of the circumspheres are connected to form an approximate skeleton. The circumspheres are then adjusted to minimize an error in the disposition of the vertices of the approximate skeleton, thereby producing an accurate skeleton of the object.

The simplices preferably comprise Delaunay tetrahedra. The method also includes the step of removing at least some of any simplices that are external to a boundary of the object. To form the approximate skeleton, the centers of the circumspheres whose simplices share a common face are connected. This step forms a plurality of closed Voronoi cells. In addition, the method provides for removing connections between the centers of circumspheres that do not form closed Voronoi cells. A connectivity graph is created, based on common cell edges, and is traversed to identify Voronoi cells that comprise patches. These patches collectively approximate the skeleton.

The step of adjusting modifies either the disposition of the vertices of the simplices, or the radius of a circumsphere, or the disposition of the circumsphere, to create a maximal inscribed sphere. A circumsphere is a maximal inscribed sphere if the vertices of the simplices circumscribed by the circumsphere lie on the boundary of the object and are disposed where the circumsphere is tangent to the boundary of the object.

Further, the step of adjusting provides for moving the centers of the circumspheres to correspond to centers of maximal inscribed spheres that are tangent to the boundary of the object at transverse maxima of a maximum principal curvature for the object.

A further aspect of the invention is directed to apparatus for constructing a skeleton representing an object, where the object is defined by boundary data that represent a surface of the object. The apparatus includes a memory for storing machine instructions that comprise a computer program. A processor, coupled to the memory, executes the computer program and thereby implements a plurality of functions. These functions are generally consistent with the steps of the method discussed above.

A still further aspect of the present invention is directed to an article of manufacture for use with a computer to construct a skeleton for an object. The article comprises a memory media on which are stored a plurality of machine instructions. When executed on a computer, the machine instructions cause the computer to implement functions that are consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 3:
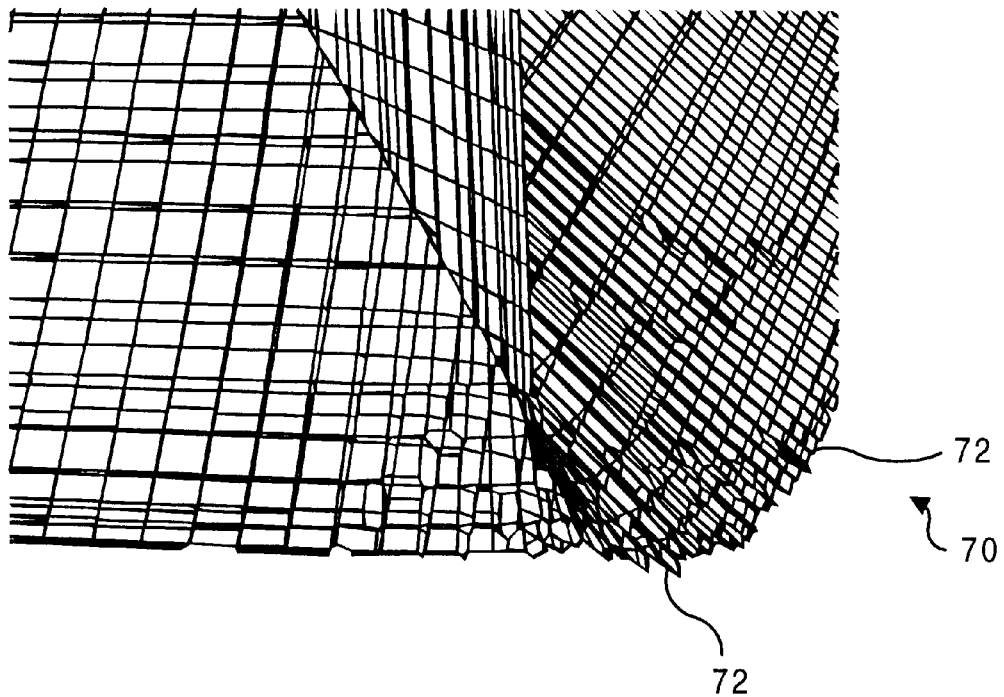
FIG. 3 illustrates a portion of a pruned Voronoi cell approximation to the skeleton of an object having a super ellipsoidal shape, in which significant jaggedness is observed near the skeleton edges.
Figure 4:
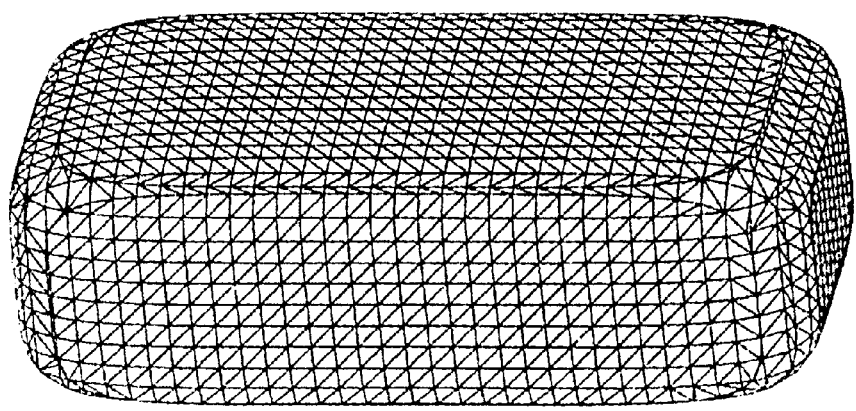
FIG. 4 shows an image of the super ellipsoidal shape referenced in FIG. 3.
Figure 5A:
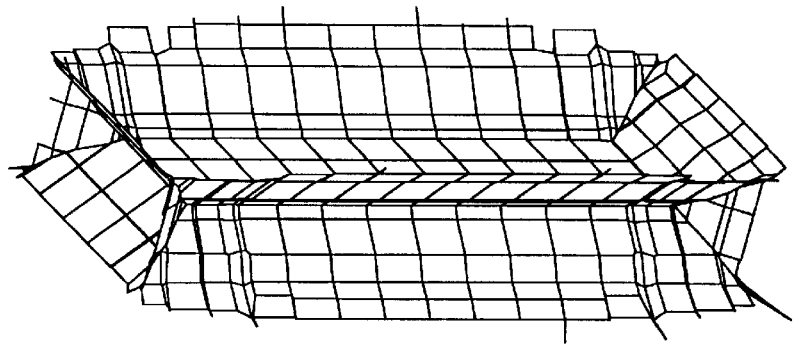
Figure 5B:
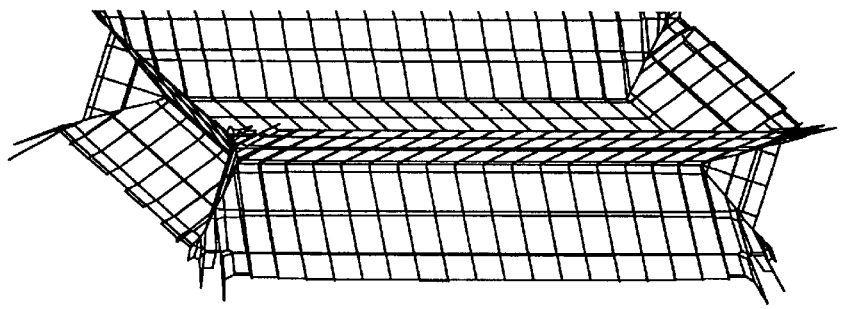
Figure 5C:
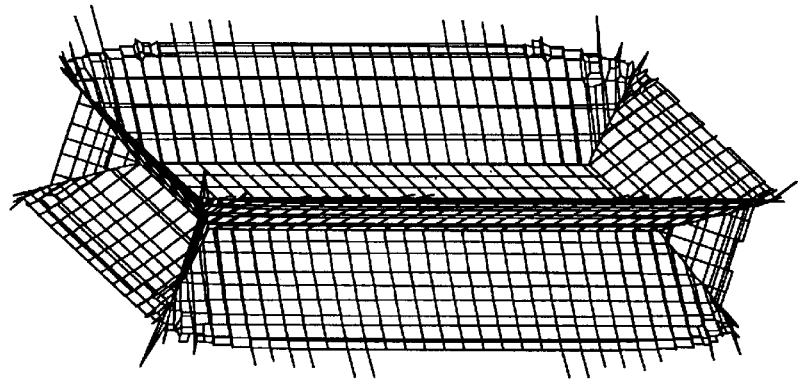
Figure 5D:
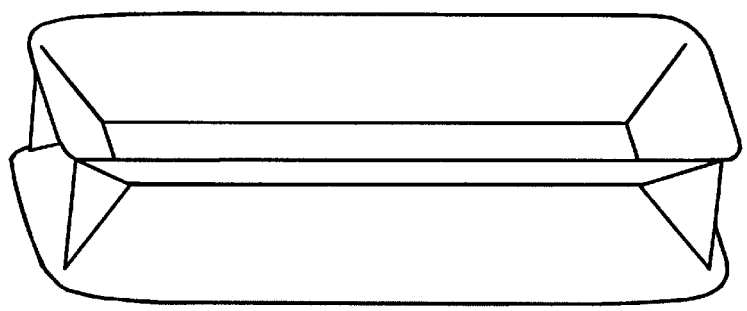
Figure 6:
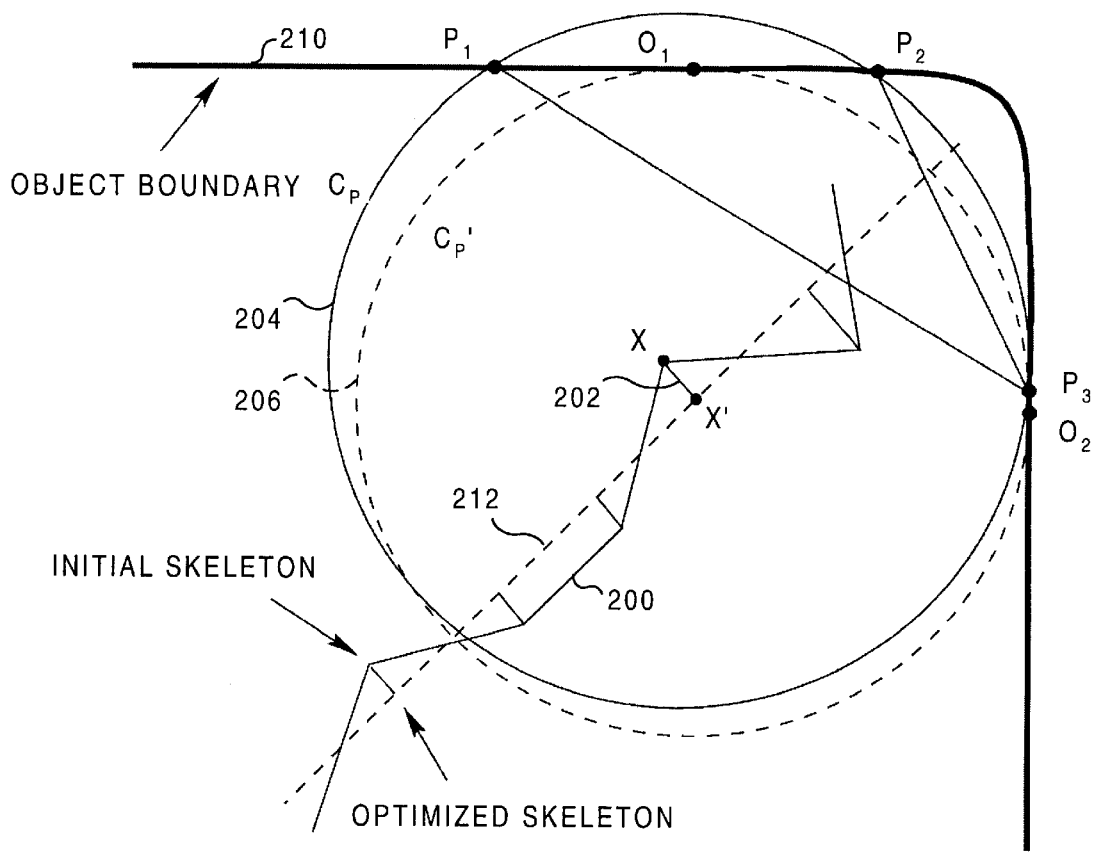
Figure 7:
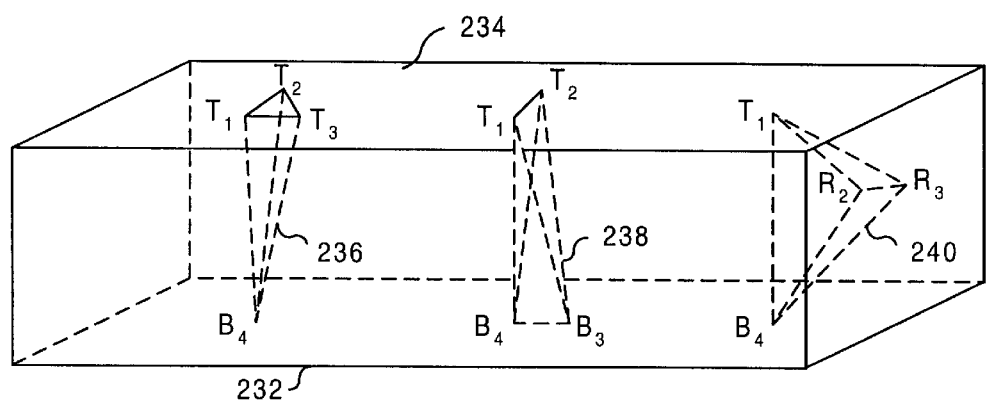
Figure 8:
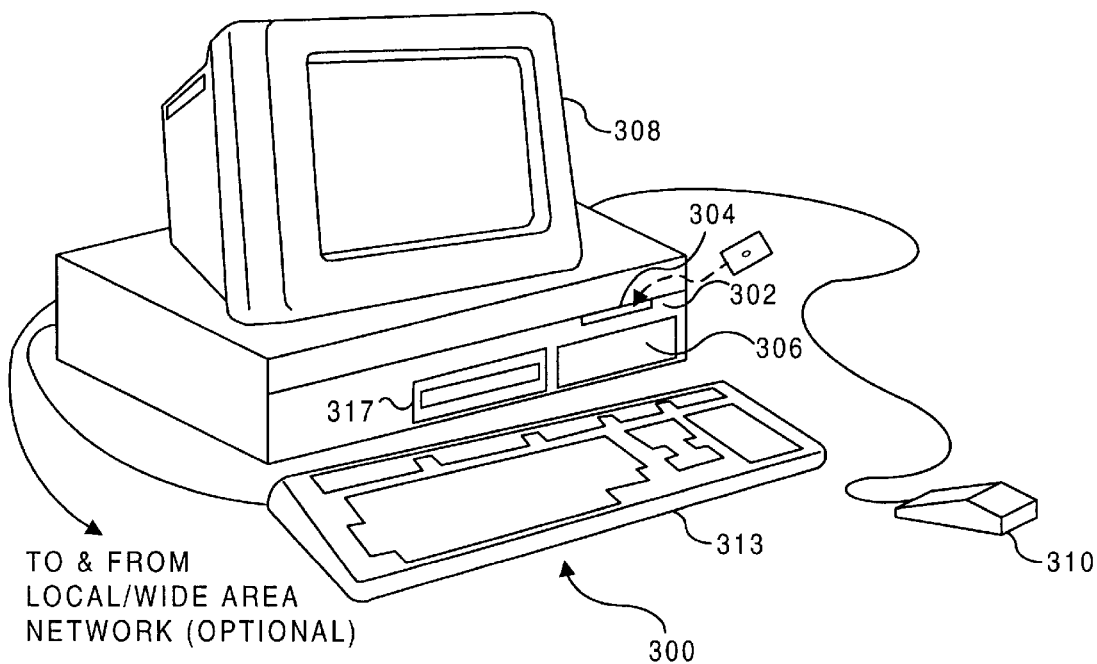

FIGS. 5A, 5B, and 5C are isometric views of Voronoi cell approximations to a skeleton of a block for 500 sample points, 1000 sample points, and 2000 sample points, respectively;

FIG. 5D is an isometric view of the skeleton of the super ellipsoidal shape of FIGS. 3 and 4, after the skeleton has been adjusted in accord with the present invention to minimize errors in the interior and along the edge;

FIG. 6 shows the error of an internal portion of an approximate skeleton relative to a corresponding portion of the skeleton that is adjusted to minimize errors;

FIG. 7 illustrates three geometric classes of tetrahedra in regard to merging or coalescing vertices of the tetrahedra; and FIG. 8 is a schematic illustration of a personal computer or workstation suitable for use in implementing the present invention.

DESCRIPTION OF THE PREFERRED EMBODIMENT

The basic idea of the skeleton generation process is to construct the topology and initial geometry of the skeleton from the Delaunay triangulation of a suitable discretization of the boundary of the object, and then to adjust the geometry of the skeleton interior and edge points to reduce errors in the skeleton. Given an object $\Omega$ and points on its surface $\partial\Omega$, the Delaunay triangulation of this set of points is computed and the Delaunay centers, i.e., the centers of the spheres circumscribed about each Delaunay simplex, are evaluated. Under certain conditions, as the density of the point sampling on $\partial\Omega$ increases, the Delaunay spheres corresponding to the interior Delaunay simplices approach tangency to $\partial\Omega$. Therefore, the Delaunay spheres approximate the maximal spheres covering the object's interior, and the closed Voronoi cells connecting the centers of these spheres-a subset of the Voronoi diagram-converge towards the skeleton.

Creating an Initial Approximate Skeleton

Figure 1A:
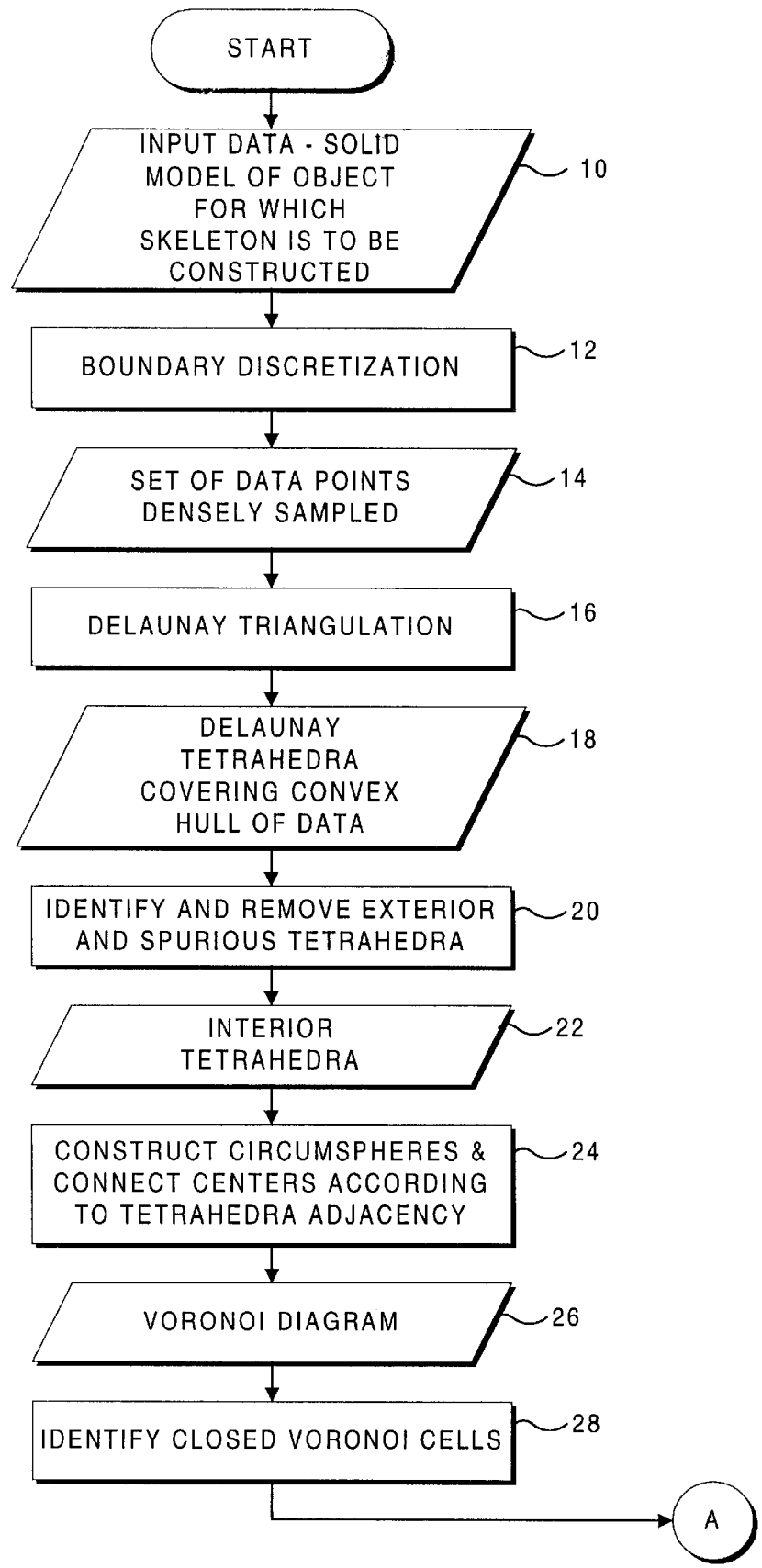
FIGS. 1A and 1B are a block diagram or flow chart illustrating the steps of a procedure for constructing a more accurate polygonal approximation to the skeleton of an object described by a solid model.
Figure 1B:
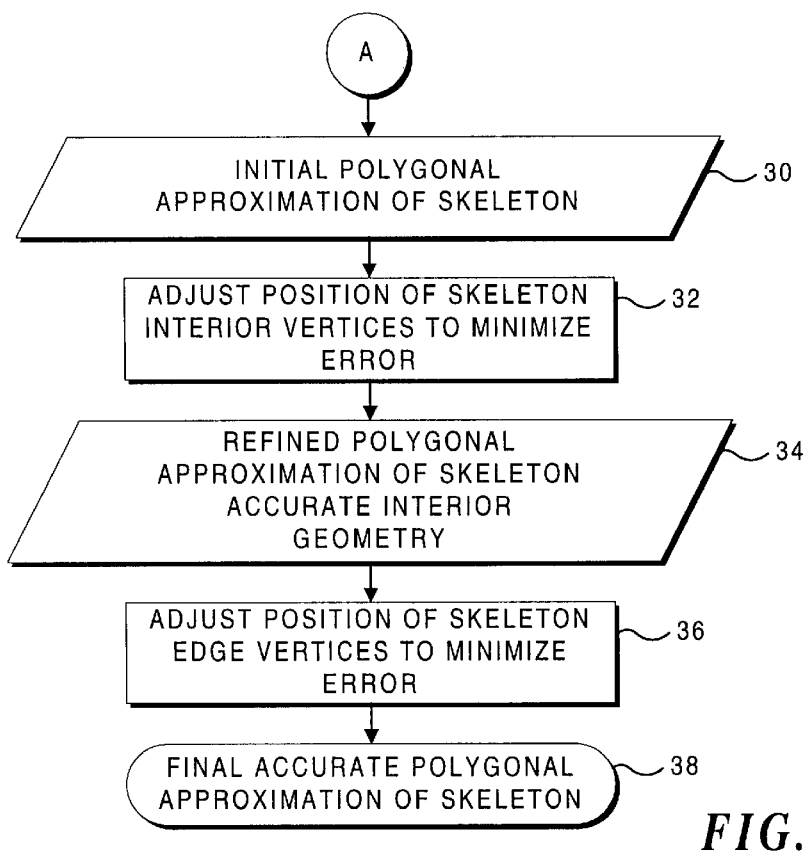

FIGS. 1A and 1B identify the steps of the procedure for constructing accurate polygonal skeletons. The process begins by sampling the boundary to obtain a set of surface data points. Alternatively, as indicated in a block 10 in FIG. 1A, surface data points defining a solid model of the object for which a skeleton is to be constructed can be provided as an input to the process. These surface data points can be obtained using a variety of available polygonization procedures such as the one presented by Bloomenthal (in "An Implicit Surface Polygonizer," *Graphics Gems IV*, ed. P. S. Heckbert, AP Professional, Cambridge, Mass., 1994, pp. 324–349). The sample is evaluated to determine the sample spacing, i.e., the maximum distance between a point and its nearest neighbor. Resampling is performed until the sample is boundary conforming, and the sample spacing is smaller than the size of the smallest surface feature to be accounted for, i.e., to ensure boundary discretization as provided in a block 12. Once the boundary has been appropriately sampled, yielding a set of densely sampled data points as noted in a block 14, Delaunay triangulation is performed to produce a set of tetrahedra having vertices at the data points and no data point in the interior of any of the tetrahedra; this step is indicated in a block 16. As provided in a block 18, the Delaunay tetrahedra cover a convex hull of data for the object.

Of the tetrahedra produced by the Delaunay triangulation, those lying outside the object are identified and removed from the set, in the step of a block 20. The set of tetrahedra noted in block 18 may also contain spurious tetrahedra that lie very close to the object boundary, but which do not properly correspond to a skeleton edge. Spurious tetrahedra can be maintained in the set until an adjustment is made to minimize edge errors, at which time they are identified by the absence of a nearby surface point satisfying the skeleton edge identification criterion. Alternatively, a heuristic approach may be applied to remove tetrahedra whose inscribed centers lie outside a slightly shrunken version of the object. The heuristic approach may eliminate a few valid tetrahedra, but the adjustment procedure described below corrects the geometry so that the final skeleton produced is still accurate.

Once an appropriate set of Delaunay tetrahedra has been obtained as noted in a block 22, the corresponding circumspheres are constructed around the Delaunay tetrahedra, and the centers of the circumspheres are connected across each face shared by two Delaunay tetrahedra so that Delaunay center connectivity is determined by Delaunay tetrahedra face adjacency. These steps are referenced in a block 24. The Delaunay centers of all Delaunay tetrahedra sharing a common edge are thereby connected to form a closed loop referred to as a Voronoi cell. Collectively, as indicated in a block 26, the Voronoi cells comprise a Voronoi diagram. Connections between the centers of circumspheres that do not form a closed cell are removed. The closed Voronoi cells are retained, as noted in a block 28, and a cell connectivity graph based on common cell edges is formed. The connectivity graph is traversed to identify collections of cells that form the patches or sheets that collectively approximate the object's skeleton. Sheet boundaries are composed of skeleton edges (i.e., Voronoi edges belonging to only one cell that exist at the extremities of the skeleton), and seams comprising Voronoi edges belonging to more than two Voronoi cells where multiple sheets meet. The Voronoi cells are subdivided into triangles. By the introduction of internal edges, creating the initial polygonal approximation of the skeleton, as referenced in a block 30 of FIG. 1B, these triangles remain plane as their vertex locations are adjusted (as described below).

While the polygon set described above approximates the skeleton, and the approximation converges to the object's skeleton for very dense sampling, the accuracy of the approximation improves slowly with increased sample density, as demonstrated by FIGS. 5A, 5B, and 5C. These Figures respectively show Voronoi cell skeleton approximations for a block obtained from 500, 1000, and 2000 surface points. It will be noted that the convergence to the skeleton interior points is relatively rapid for regions on the "rectangular" middle patch. However, near the edges of the skeleton, larger errors appear. Even for the dense sampling of 2000 surface points, the errors remain noticeable and the skeleton edge approximation is also noticeably jagged.

Improving the Accuracy of the Skeleton Interior

To improve the polygonal skeleton approximation, adjustment procedures are employed in a block 32 of FIG. 1B to identify, with greater accuracy, the location of a skeleton point near each vertex of the initial polygonal approximation. The skeleton point is identified as the center of a maximal inscribed sphere, and the maximal inscribed sphere is found by adjusting the vertices, center, and/or radius of a circumsphere until a maximal inscribed sphere is prescribed. For the adjusted circumsphere to be maximal, each of the (adjusted) vertices must lie on the object boundary, be equidistant from the adjusted center, and lie at a tangency of the circumsphere with the boundary. After these adjustments are completed, the result is a refined polygonal approximation of the skeleton, with an accurate interior geometry, as indicated in a block 34.

FIG. 6 represents a simple example showing how an adjustment is made to the vertices, radius, and disposition of a circumsphere 204 to minimize an error in the interior portion of a skeleton. In this example, the circumsphere and skeleton are shown in only two dimensions to more clearly illustrate the adjustment technique. The initial approximate skeleton for this portion of the object is represented by a line 200 that connects the centers of the circumspheres previously created. Circumsphere 204 extends through vertices, $P_1$, $P_2$, $P_3$, $P_4$, of the Delaunay tetrahedron about which it was formed, and x indicates the center of that Delaunay tetrahedron. Further, x' and r (not shown) respectively denote the center and radius of an adjusted circumsphere 206, and $P'_1$, $P'_2$, $P'_3$, and $P'_4$ are the adjusted contact points (not all of which will be distinct) for this circumsphere. More generally, the vectors $n_f(P'_i)$ and $n_s(P'_i)=(P'_i-x)$ are the respective normals to a boundary 210 and the circumsphere at the point $P'_i$. The local problem to adjust the position of a vertex of a Voronoi cell is then stated as follows:

Find $\{P'_1, P'_2, P'_3, P'_4, x', r\}$ so as to minimize $\|x'-x\|^2$ (the error corresponding to line 202) subject to the constraints that $P'_i$ lies on the boundary:

$$\|P'_i - x'\|^2 = r^2, \text{ for } i = 1, 2, 3, 4 \tag{1}$$

and the surface normal vector evaluated at the point is parallel to the normal to the circumsphere centered at the point:

$$\|n_f(P'_i) \times n_s(P'_i) = 0\| \text{ for } i = 1, 2, 3, 4 \tag{2}$$

In this form, the position of each interior point on the approximate skeleton is adjusted as the result of a local adjustment problem involving 16 scalar variables and 12 constraints. The result is a refined portion of the skeleton represented by a dash line 212. In the preferred embodiment, a projected Lagrangian method, Sequential Quadratic Programming (SQP), is employed to solve these problems. The adjustment process moves all vertices to surface contact points. Since skeleton interior points typically have only two distinct contact points, some of the vertices coalesce during the adjustment, and the vertices that start closest together are most likely to coalesce. For example, in FIG. 6, vertices $P_1$ and $P_2$ coalesce into a new vertex $O_1$ during the adjustment of circumsphere 204 to form new circumsphere 206.

Because finding the distinct contact points is sufficient to determine the maximal sphere and the corresponding skeleton point at its center, the formulation above is often more general than required. A heuristic approach in which vertices lying closest together are merged is employed to produce smaller adjustment problems that are less expensive to solve. Heuristics can be used to identify vertices that are likely to coalesce, thereby reducing the dimensionality of the adjustment problem that must be solved for each tetrahedron. For interior points, the simplified problem includes ten variables (locations of the two contact points and the center and radius of the maximal inscribed sphere), with five constraints (contact points on the boundary, tangent to the sphere, and equidistant from the center). An initial guess for the values of these variables depend on the geometry of the tetrahedron involved.

In FIG. 7, three relevant geometric classes of tetrahedra are illustrated, including a class 236 that has a face with vertices on one of a bottom 232 and a top 234 (or other surfaces) of an object 230, a class 238 that has one or more line segments on a surface of the object, and a class 240 that has only points on the two surfaces of the object. Initial guesses for the boundary point locations are obtained as the ends of a line segment generated by merging the vertices of the tetrahedron, and the initial guess for the center is the center of the circumsphere. Based on the class of the tetrahedra, the initial guesses are generated and used to determine the ten variables required to define a skeleton point. For example, in class 236, a small face is defined by vertices $T_1$, $T_2$, and $T_3$, which are likely to coalesce and are therefore merged a priori so that an adjustment is made starting with the two end points of the resulting line segment that extends between bottom 232 and top 234. Similarly, the tetrahedra in class 238 have two short edges between pairs of vertices ($TT_2$, and $B_1B_2$) that are likely to coalesce and can be merged to produce initial guesses. In the preferred embodiment, the merging is accomplished by determining D, the maximum average edge length associated with a vertex. If the shortest edge has a length less than D/5, its vertices are merged to produce a triangle to which the same merging criterion is applied. If these heuristics are not satisfied for a tetrahedron, the 16 variable problem is solved to produce the required skeleton point. For seam points, which occur for tetrahedra in class 240, the 16 variable model is used to generate the adjusted maximal inscribed spheres that possess three and four distinct contact points.

Improving the Accuracy of the Skeleton near Its Edges

In practice, the most significant inaccuracies are typically concentrated near the edge of the skeleton. Referring again to FIG. 1B, a block 36 provides for adjusting the position of skeleton edge vertices to minimize the errors of the refined skeleton. The result of this adjustment is a final accurate polygonal approximation of the skeleton, as indicated in a block 38. Since the edge of the skeleton arises as a result of the closure of the set of maximal inscribed spheres possessing distinct boundary tangency points, the maximal inscribed spheres associated with the skeleton edge possess only a single boundary tangency. Since distinct boundary tangencies do not exist, the optimization described above for adjusting the location of the interior vertices of the skeleton approximation will not be effective. An alternative approach is used to improve the location of the skeleton edge vertices. For sharp edges of the object (where the surface normal changes discontinuously), the skeleton extends to the boundary of the object, and the approximate skeleton vertex is moved to the nearest point on the sharp boundary edge. For smooth regions of the boundary, the skeleton edge does not extend to the boundary of the object. Skeleton edge points lie in the interior of the object and are centers of maximal spheres that contact the boundary at a single point where the two distinct tangency points of nearby maximal spheres effectively coalesce. This single tangency point is distinguished as a location of maximum value of principal curvature as the surface is traversed in the direction of maximal curvature. The edge optimization procedure can be summarized as follows:

Let x be a center of a circumsphere around a Delaunay tetrahedra at the edge of the skeleton. The problem is then to find a boundary point P to minimize $\|x'-x\|$, where x' is the location of the center of the maximal circumsphere tangent to the boundary at O' subject to the constraints that P lies on the boundary and $\nabla K_1 \cdot u_1 = 0$, $K_1$ is the maximal principal curvature at P, and $u_1$ is the direction vector associated with maximal principal curvature at P.

The edge vertex optimization involves three scalar variables and two constraints and is solved in the current embodiment by the SQP algorithm. Some care is appropriate in the selection of starting points for the optimization since nearby inflection points of the maximum curvature may cause convergence to a minimum rather than a maximum of $K_1$. To attain reliable results, it is best to begin the optimization with a point on the curve of surface tangency points corresponding to the skeleton edge. This curve of associated tangency points for the skeleton edge is a principal curve associated with the direction of minimum curvature and is illustrated for the example of FIG. 2. A curve-tracing method, stepping in the direction of minimum curvature and searching transversely to find the local maxima of maximum principal curvature, is employed to follow this curve and sequentially generate starting points for the edge optimization.

Figure 2:
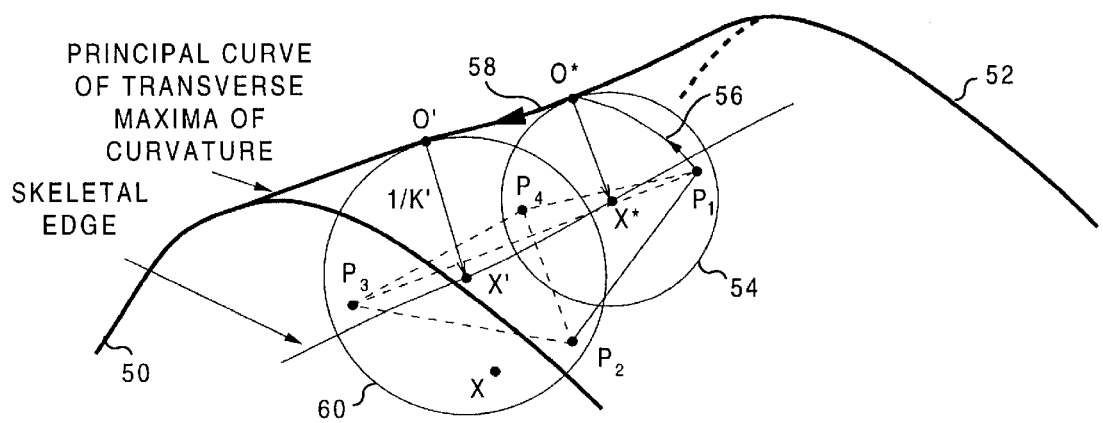
FIG. 2 is a graph illustrating a principal curve of transverse maxima of curvature and the points considered during adjustment of the skeleton edge geometry.

In the example of FIG. 2, the skeleton edge was previously defined by a circumsphere center at x. Curves 50 and 52 represent the actual shape of the surface of the object at spaced-apart transverse points along the surface. The principal curve of transverse maxima of curvature is represented by a line 58. Starting at a vertex $P_1$, which is a surface point, the process traverses along a curve 56 until it reaches the principal curve of transverse maxima of principal curvature represented by line 58. This point then is used to define a circumsphere centered at x* that is tangent to the surface ↔ at 0*, which lies on line 58. Additional circumspheres tangent to line 58 are then formed that meet the conditions noted above. The line through the centers of the these circumspheres then accurately defines the skeletal edge of the object. For example, the sphere centered at x' is tangent to the surface at 0'.

FIG. 3 shows a portion of a pruned Voronoi cell approximation 70 to the skeleton of a super ellipsoid 76, shown in FIG. 4. This approximation is based on 20,000 sampled surface points, and significant jaggedness is still observed near an edge 72 of the skeleton.

In FIG. 5D, the skeleton of the super ellipsoidal shape of FIGS. 3 and 4 is illustrated after the present invention has been employed to minimize errors in the interior and along at the edges of the skeleton. The benefits of the adjustment process used to minimize these errors will be readily apparent to those of skill in this art.

System for Implementing the Creation of a Skeleton

With reference to FIG. 8, a generally conventional personal computer 300 is illustrated, which is suitable for use in connection with practicing the present invention. Alternatively, a corresponding workstation on a local area network may be used for executing machine instructions comprising a computer program that causes the present invention to be executed. Personal computer 300 includes a processor chassis 302 in which are mounted a floppy disk drive 304, a hard drive 306, a motherboard populated with appropriate integrated circuits (not shown), and a power supply (also not shown), as are generally well known to those of ordinary skill in the art. A monitor 308 is included for displaying graphics and text generated by software programs that are run by the personal computer, and for graphically representing models of objects produced by the present invention. A mouse 310 (or other pointing device) is connected to a serial port (or to a bus port) on the rear of processor chassis 302, and signals from mouse 310 are conveyed to the motherboard to control a cursor on the display and to select text, menu options, and graphic components displayed on monitor 308 by software programs executing on the personal computer. In addition, a keyboard 313 is coupled to the motherboard for user entry of text and commands that affect the running of software programs executing on the personal computer.

Personal computer 300 also optionally includes a compact disk-read only memory (CD-ROM) drive 317 into which a CD-ROM disk may be inserted so that executable files and data on the disk can be read for transfer into the memory and/or into storage on hard drive 306 of personal computer 300. Other types of mass memory storage devices may also be provided. The machine instructions comprising the software program that causes the CPU to implement the functions of the present invention that have been discussed above will likely be distributed on floppy disks or CD-ROMs or other memory media and stored in the hard drive until loaded into random access memory (RAM) for execution by the CPU.

Although the present invention has been described in connection with the preferred form of practicing it, those of ordinary skill in the art will understand that many modifications can be made thereto within the scope of the claims that follow. Accordingly, it is not intended that the scope of The invention in any way be limited by the above description, but instead be determined entirely by reference to the claims that follow.

The invention in which an exclusive right is claimed is defined by the following:

1. A method for using a computer to construct a skeleton representing an object, said object being defined by boundary data that represent a surface of the object, comprising the steps of:
   (a) producing simplices having vertices at surface data points that sample a boundary of the object;
   (b) forming circumspheres comprising hyperspheres that circumscribe the simplices;
   (c) connecting centers of the circumspheres to form an approximate skeleton; and
   (d) adjusting the circumspheres so as to minimize an error in the disposition of the vertices of the approximate skeleton and thereby producing an accurate skeleton of the object.

2. The method of claim 1, wherein the simplices comprise Delaunay tetrahedra.

3. The method of claim 1, further comprising the step of removing at least some of any simplices that are external to a boundary of the object.

4. The method of claim 1, wherein the centers of the circumspheres whose simplices share a common face are connected to form the approximate skeleton, said step of connecting forming a plurality of closed Voronoi cells.

5. The method of claim 4, further comprising the step of removing connections between the centers of circumspheres that do not form closed Voronoi cells.

6. The method of claim 5, further comprising the step of forming a connectivity graph based on common cell edges, said connectivity graph being traversed to identify Voronoi cells that comprise patches, said patches collectively approximating the skeleton.

7. The method of claim 1, wherein the step of adjusting includes the step of adjusting at least one of:
   (a) a disposition of the vertices of the simplices;
   (b) a radius of a circumsphere; and
   (c) a disposition of the circumsphere to create a maximal inscribed sphere, a circumsphere being a maximal inscribed sphere if the vertices of said simplices circumscribed by the circumsphere lie on the boundary of the object and are disposed where the circumsphere is tangent to the boundary of the object.

8. The method of claim 1, wherein the step of adjusting includes the step of adjusting the centers of the circumspheres to correspond to centers of maximal inscribed spheres that are tangent to the boundary of the object at transverse maxima of a maximum principal curvature for the object.

9. A method for using a computer to construct a skeleton for an object, said object being defined by boundary data that represent a surface of the object, comprising the steps of:
   (a) performing a Delaunay triangulation of surface point data that sample a boundary of the object at a plurality of points to produce tetrahedra having vertices at the points, said tetrahedra not containing any of the points and comprising a convex hull of the surface point data;
   (b) removing at least some of any tetrahedra that lie outside the boundary of the object;
   (c) constructing circumspheres that circumscribe the tetrahedra disposed within the boundary;
   (d) connecting centers of adjacent circumspheres circumscribed about tetrahedra that share a common face, and forming Voronoi cells using connections that are created thereby;
   (e) identifying closed Voronoi cells and removing centers of circumspheres that are not part of any closed Voronoi cell and connections to said centers, producing an approximation of the skeleton;
   (f) adjusting positions of interior vertices of the approximate skeleton by adjusting at least one of: dispositions of the vertices, lengths of radii, and dispositions of centers of the circumspheres, to produce maximal inscribed spheres; and
   (g) adjusting positions of edge vertices of the skeleton to correspond to centers of other maximal inscribed spheres that are tangent to the boundary at single points of transverse maxima of a maximum principal curvature, yielding an accurate skeleton of the object.

10. The method of claim 9, wherein a circumsphere is a maximal inscribed sphere if the vertices of the tetrahedra that the circumsphere circumscribes lie on a boundary of the object and are disposed where the circumsphere is tangent to the boundary of the object.

11. The method of claim 9, wherein the surface point data have sufficient density so that a maximum distance between adjacent points is smaller than any surface feature to be represented by the skeleton.

12. The method of claim 9, further comprising the step of removing spurious tetrahedra that occur apart from any portion of the object associated with an edge point of the skeleton.

13. The method of claim 9, further comprising the step of subdividing the Voronoi cells into triangles by introducing internal edges.

14. The method of claim 9, further comprising the step of constructing a connectivity graph, wherein the approximate skeleton is formed by traversing the connectivity graph to identify patches that collectively comprise the approximate skeleton.

15. Apparatus for constructing a skeleton representing an object, said object being defined by boundary data that represent a surface of the object, comprising:
   (a) a memory for storing machine instructions that comprise a computer program; and
   (b) a processor, coupled to the memory, said processor executing the computer program and thereby implementing a plurality of functions, including:
      (i) producing simplices having vertices at surface data points that sample a boundary of the object;
      (ii) forming circumspheres comprising hyperspheres that circumscribe the simplices;
      (iii) connecting centers of the circumspheres to form an approximate skeleton; and
      (iv) adjusting the circumspheres so as to minimize an error in the disposition of the vertices of the approximate skeleton and thereby producing an accurate skeleton of the object.

16. Apparatus for constructing a skeleton for an object, said object being defined by boundary data that represent a surface of the object, comprising:
   (a) a memory for storing machine instructions that comprise a computer program; and
   (b) a processor, coupled to the memory, said processor executing the computer program and thereby implementing a plurality of functions, including:
      (i) performing a Delaunay triangulation of surface point data that sample a boundary of the object at a plurality of points to produce tetrahedra having vertices at the points, said tetrahedra not containing any of the points and comprising a complex hull of the surface point data;

(ii) removing at least some of any tetrahedra that lie outside the boundary of the object;

(iii) constructing circumspheres that circumscribe the tetrahedra disposed within the boundary;

(iv) connecting centers of adjacent circumspheres circumscribed about tetrahedra that share a common face, and forming Voronoi cells using connections that are created thereby;

(v) identifying closed Voronoi cells and removing centers of circumspheres that are not part of any closed Voronoi cell and connections to said centers, producing an approximation of the skeleton;

(vi) adjusting positions of interior vertices of the approximate skeleton by adjusting at least one of: dispositions of the vertices, lengths of radii, and dispositions of centers of the circumspheres, to produce maximal inscribed spheres; and (vii) adjusting positions of edge vertices of the skeleton to correspond to centers of other maximal inscribed spheres that are tangent to the boundary at single points of transverse maxima of a maximum principal curvature, yielding an accurate skeleton of the object.

17. An article of manufacture for use with a computer to construct a skeleton representing an object, said object being defined by boundary data that represent a surface of the object, comprising:

(a) a memory media, adapted to be used with a computer; and (b) a plurality of machine instructions stored on the memory media, said machine instructions, when executed by the computer, effecting a plurality of functions, including:

(i) producing simplices having vertices at surface data points that sample a boundary of the object;

(ii) forming circumspheres comprising hyperspheres that circumscribe the simplices;

(iii) connecting centers of the circumspheres to form an approximate skeleton; and (iv) adjusting the circumspheres so as to minimize an error in the disposition of the vertices of the approximate skeleton and thereby producing an accurate skeleton of the object.

18. An article of manufacture for use with a computer to construct a skeleton for an object, said object being defined by boundary data that represent a surface of the object, comprising:

(a) a memory media, adapted to be used with a computer; and (b) a plurality of machine instructions stored on the memory media, said machine instructions, when executed by the computer, effecting a plurality of functions, including:

(i) performing a Delaunay triangulation of surface point data that sample a boundary of the object at a plurality of points to produce tetrahedra having vertices at the points, said tetrahedra not containing any of the points and comprising a complex hull of the surface point data;

(ii) removing at least some of any tetrahedra that lie outside the boundary of the object;

(iii) constructing circumspheres that circumscribe the tetrahedra disposed within the boundary;

(iv) connecting centers of adjacent circumspheres circumscribed about tetrahedra that share a common face, and forming Voronoi cells using connections that are created thereby;

(v) identifying closed Voronoi cells and removing centers of circumspheres that are not part of any closed Voronoi cell and connections to said centers, producing an approximation of the skeleton;

(vi) adjusting positions of interior vertices of the approximate skeleton by adjusting at least one of: dispositions of the vertices, lengths of radii, and dispositions of centers of the circumspheres, to produce maximal inscribed spheres; and (vii) adjusting positions of edge vertices of the skeleton to correspond to centers of other maximal inscribed spheres that are tangent to the boundary at single points of transverse maxima of a maximum principal curvature, yielding an accurate skeleton of the object.

* * * * *

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Column 1,
Line 4, before "RELATED APPLICATIONS' insert the following section heading and paragraph:
-- GOVERNMENT RIGHTS
This invention was made with government support under grant number N00014-95-1-0355 awarded by the Department of the Navy and NSF Grant No. DMI 9312932 as well as NASA Grant No. 2-831. The Government has certain rights to the invention. --

Item [56], "U.S. Patent Documents," 3$^{rd}$ Ref. "5,542,036 7/1996 Schroeder et al." should read -- 5,542,036 06/1996 Schroeder et al. --.
Item [56], "Other Publications," 5$_{th}$ Ref. "Discrete" should read -- Discrete --
Item [56], "Other Publications" after the last reference, please add the following references:
-- Barequet, G., et al., *Piecewise-Linear Interpolation Between Polygonal Slices*, PROCEEDINGS OF THE TENTH ANNUAL SYMPOSIUM ON COMPUTATIONAL GEOMETRY, ACM Press, June 1994, pp. 93-102.

Blechschmidt, J.L., et al., *The Use of Algebraic Functions as a Solid Modeling Alternative: An Investigation*, ADVANCES IN DESIGN AUTOMATION: COMPUTER-AIDED AND COMPUTATIONAL DESIGN, Vol. DE-23(1), 1990, pp. 33-41.

Blinn, J.F., *A Generalization of Algebraic Surface Drawing*, ACM TRANSACTIONS ON GRAPHICS, Vol. 1, No. 3, July 1982, pp. 235-256.

Bloomenthal, J., *An Implicit Surface Polygonizer*, GRAPHIC GEMS IV, P.S. Heckbert, editor, AP Professional, Cambridge, Massachusetts, 1994, pp. 324-349.

Blum, H., *A Transformation for Extracting New Descriptors of Shape*, MODELS FOR THE PERCEPTION OF SPEECH AND VISUAL FORM, W. Wathen-Dunn, editor, MIT Press, 1967, pp. 362-381.

Boissonnat, J.D., *Geometric Structures for Three-Dimentsional Shape Representation*, ACM TRANSACTIONS ON GRAPHICS, 3(4), 1984, pp. 266-286.

Boissonnat, J.D., *Shape Reconstruction from Planar Cross Sections*, COMPUTER VISION, GRAPHICS, AND IMAGE PROCESSING, Vol. 44, October 1988, pp. 1-29.

Boult, T.E., et al., *Recovery of Superquadrics from Depth Information*, PROCEEDINGS OF WORKSHOP ON SPATIAL REASONING AND MULTI-SENSOR FUSION, 1987, pp. 128-137.

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Chiang, C.S., et al. *How to Compute Offsets Without Self-Intersection*, CURVES AND SURFACES IN COMPUTER VISION AND GRAPICS II, SPIE, Vol. 1610, 1991.

Chou, J.J., *Voronoi Diagrams for Planar Shapes*, IEEE COMPUTER GRAPHICS AND APPLICATIONS, 15(2), March 1995, pp. 52-59.

Christiansen, H., et al., *Conversion of Complex Contour Line Definitions Into Polygonal Element Mosaics*, COMPUTER GRAPHICS, 12(3), 1978, pp. 187-192.

Danielsson, P.E., *Euclidean Distance Mapping*, COMPUTER GRAPHICS AND IMAGE PROCESSING, 14, 1980, pp. 227-248.

DeRose, T., et al., *Geometric Continutiy, Shape Parameters, and Geometric Constructions for Catmull-Rom Splines*, ACM TRANSACTION ON GRAPHICS, 7(1), 1988, pp. 1-41.

Dobkin, D.P., et al., *Primitives for the Manipulation of Three-Dimensional Subdivisions*, ALGORITHMICA, Vol. 4, 1989, pp. 3-32.

Dong, Y., et al., *Building Solid Models From Serial Contour Images*, PROCEEDINGS FO THE SPIE - IMAGE AND VIDEO PROCESSING III, Vol. 2421, San Jose, California, USA, 9-10 February 1995, pp. 152-160.

Dutta, D., et al., *On the Skeleton of Simple CSG Objects*, ASME JOURNAL OF MECHANICAL DESIGN, 115(1), 1992, pp. 87-94.

Edelsbrunner, H., et al., *Three-Dimensional Alpha Shapes*, ACM TRANSACTIONS ON GRAPHICS, 13(1), 1994, pp. 43-72.

Ensz, M.T., et al., *Implicit Function Alteration Via Radius Mapping and Direct Function Modification*, ASME ADVANCES IN DESIGN AUTOMATION, DE-Vol. 82-1, 1995, pp. 57-64.

Ferrie, F.P., *Recovery of Volumetric Object Descriptions From Laser Range Finger Images*, PROCEEDINGS OF COMPUTER VISION, ECCV 90, Antibes, France, 1990, pp. 387-396.

Foley, T.A., et al. *Advances in Scattered Data Interpolation*, SURVEYS ON MATHEMATICS FOR INDUSTRY, 4(2), 1994, pp. 71-84.

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Franke, R., et al., *Scattered Data Interpolation and Application: A Tutorial and Survey*, GEOMETRIC MODELING, METHODS, AND APPLICATIONS, Boblingen, Germany, June 1990, pp. 131-160.

Fuchs, H., et al, *Optimal Surface Reconstruction From Planar Contours*, COMMUNICATIONS OF THE ACM, Vol. 20, No. 10, October 1997, pp. 693-702.

Ganapathy, S., et al., *A new General Triangulation Method for Planar Contours*, COMPUTER GRAPHICS, 16(3), 1982, PP. 69-75.

Ganter, M.A., et al., *On Algebraic Methods for Implicit Swept Solids with Finite Extent*, ADVANCES IN DESIGN AUTOMATION, DE-Vol. 65-2, Vol. 2, Albuquerque, New Mexico, USA, September 1993, pp. 389-396.

Gelston, S.M., et al., *Boundary Surface Recovery from Skeleton Curves and Surfaces*, COMPUTER AIDED GEOMETRIC DESIGN, 12(2), 1995, PP. 27-51.

Gursoy, H,N., et al., *An Automated Coarse and Fine Surface Mesh Generation Scheme Based On Medial Axis Transform: Part I Algorithms*, ENGINEERING WITH COMPUTERS, 8(3), 1992, pp. 121-137.

Hoffman, C.M., *How to Construct the Skeletons of CSG Objects*, PROCEEDINGS OF THE FOURTH IMA CONFERENCE: THE MATHEMATICS FO SURFACES, A. Bowyer and J. Davenport, editors Oxford University Press, 1994, pp. 77-88.

Hoffman, C.M., *Constrained Surface Computations and Applications in Geometric Modeling*, WORKSHOP ON COMPUTATIONAL GEOMETRY, World Scientific Publishing Co., 1993, pp. 175-200.

Hoppe, H., et al., *Mesh Optimization*, COMPUTER GRAPHICS PROCEEDINGS SIGGRAPH '93, Annual Conference Series, 1993, pp. 19-26.

Hoppe, H., et al., *Surface Reconstruction From Unorganized Points*, COMPUTER GRAPHICS, SIGGRAPH '92, 1992, pp. 71-78.

Hsieh, Y.C., et al., *Reconstruction of Sculptured Surfaces Using Coordinate Measuring Machines*, ADVANCES IN DESIGN AUTOMATION, DE-Vol. 65-2, ASME, Vol. 2, Albuquerque, New Mexico, USA, 1993, pp. 35-46.

Keppel, E., *Approximating Complex Surfaces by Triangulation of Contour Lines*, IBM JOURNAL OF RESEARCH AND DEVELOPMENT, Vol. 19, January 1975, pp. 2-11.

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Kumar, V., et al., *An Assessment of Data Formats for Layered Manufacturing*, ADVANCES IN ENGINEERING SOFTWARE, REPORT NO. UM-MEAM-95-22, University of Michigan, 1995.

Lee, D.T., *Medial Axis Transformation of a Planar Shape*, IEEE TRANSACTIONS OF PATTERN ANALYSIS AND MACHINE INTELLIGENCE, Vol. PAMI-4, No. 4, July 1982, pp. 363-369.

Leymarie, F., et al. *Simulating the Grassfire Transform Using an Active Contour Model*, IEEE TRANSACTIONS ON PATTERN ANALYSIS AND MACHING INTELLIGENCE, Vol. 14, No. 1, January 1992, pp. 56-75.

Lim, C.T., et al., *Algebraic Computer-Aided Design with Maple V 2*, MATHEMATICAL COMPUTATION WITH MAPLE V: IDEAS AND APPLICATIONS, PROCEEDINGS OF THE MAPLE SUMMER WORKSHOP AND SYMPOSIUM, T. Lee, editor, University of Michigan, Ann Arbor, June 28-30, 1993, Boston, Massachusetts, USA, pp. 169-175.

Lim, C.T., et al., *Implicit Reconstruction of Solids from Cloud Point Sets*, THIRD SYMPOSIUM ON SOLID MODELING AND APPLICATIONS, C. Hoffman and J. Rossignac, editors, ACM Press, Salt Lake City, Utah, USA, 1995, pp. 393-402.

Lim, C.T., et al., *Object Reconstruction From Layered Data Using Implicit Solid Modeling*, JOURNAL OF MANUFACTURING SYSTEMS, Vol. 16, No. 4, 1977, pp. 1-13.

Lin, W.C., et al., *A New Surface Interpolation Technique for Reconstructing 3D Objects form Serial Cross-Sections*, COMPUTER VISION, GRAPHICS, AND IMAGE PROCESSING, Vol. 48, 1989, pp. 124-143.

Macworld Website, *Research System's Visible Human CD [PMAC]*, November 1995, http://www.macworld.com/pages/november.95/newproducts.1295.html, 1pg.

Meshkat, S.N. et al., *Voronoi Diagram for Multiply-Connected Polygonal Domains II: Implementation and Application*, IBM JOURNAL OF RESEARCH AND DEVELOPMENT, Vol. 31, No. 3, 1987, pp. 373-381.

Middleditch, A.E., et al., *Blend Surfaces for Set Theoretic Volume Modelling Systems*, COMOPUTER GRAPHICS, (SIGGRAPH '85 PROCEEDINGS) B.A. Barsky, editor, Vol. 19, No. 3, July 1985, pp. 161-170.

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Muraki, S., *Volumetric Shape Description of Range Data Using "Blobby Model,"* COMPUTER GRAPHICS (SIGGRAPH '91 PROCEEDINGS), Vol. 25, No. 4, July 1991, pp. 227-235.

Nackman, L.R., et al., *Curvature Relations in Tree-Dimensional Symmetric Axes,* COMPUTER GRAPHICS AND IMAGE PROCESSING, Vol. 20, 1982, pp. 43-57.

Nackman, L.R., et al., *Three-Dimensional Shape Description Using the Symmetric Axis Transform I: Theory,* IEEE TRANSACTIONS ON PATTERN ANALYSIS AND MACHINE INTELLIGENCE, Vol. PAMI-7(2), pp. 187-202.

Patrikalakis, N.M., et al., *Feature Extraction from B-Spline Marine Propeller Representations,* JOURNAL OF SHIP RESEARCH 36(3), September 1992, pp. 233-247.

Patrikalakis, N.M., et al., *Shape Interrogation by Medial Axis Transform,* ADVANCES IN DESIGN AUTOMATION: COMPUTER-AIDED AND COMPUTATIONAL DESIGN, ASME, Vol. 1, 1990, pp. 77-88.

Preparata, F.P., *The Medial Axis of a Simple Polygon,* LECTURE NOTES IN COMPUTER SCIENCE: MATHEMATICAL FOUNDATIONS OF COMPUTER SCIENCE, G. Coos and J. Hartmanis, editors, Springer-Verlag, 1977, pp. 443-450.

Reddy, J.M., et al., *Computation of 3D Skeletons Using a Generalized Delaunay Triangulation Technique,* COMPUTER-AIDED DESIGN, Vol. 27, No. 9, September 1995, pp. 677-694.

Ricci, A., *A Constructive Geometry for Computer Graphics,* THE COMPUTER JOURNAL, 16(2), May 1973, pp. 157-160.

Schroeder, W.J., et al., *An O(N) Algorithm to Automatically Generate Geometric Triangulations Satisfying the Dalaunay Circumsphere Criteria,* ENGINEERING WITH COMPUTERS, 5(3), 1989, pp. 177-193.

Scott, G.L., et al., *Using a Mixed Wave/Diffusion Process to Elicit the Symmetry Set,* IMAGE AND VISION COMPUTING, 7(1), 1989, pp. 63-70.

Shapiro, V., *Real Functions for representations of Rigid Solids,* CORNELL UNIVERSITY, DEPARTMENT OF COMPUTER SCIENCE, No. TR91-1245, 1991, pp. 1-24.

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Sheehy, D.J., et al. *Computing the Medial Surface of a Solid From a Domain Delaunay Triangulation*, PROCEEDINGS OF THE THIRD SYMPOSIUM ON SOLID MODELING AND APPLICATIONS, C. Hoffman and J. Rossignac, editors, ACM Press, 1995, pp. 201-212.

Sherbrooke, E.C., et al., *Computation of the Medial Axis Transform of 3-D Polyhedra*, PROCEEDINGS OF THE THIRD SYMPOSIUM ON SOLID MODELING AND APPLICATIONS, C. Hoffman and J. Rossignac, editors, ACM Press, 1995, pp. 187-199.

Sloan, K.R., et al., *From Contours to Surfaces: Testbed and Initial Results*, PROCEEDINGS OF THE THIRD SYMPOSIUM ON SOLID MODELING AND APPLICATIONS, C. Hoffman and J. Rossignac, editors, ACM Press, 1995, pp. 383-391.

Spivak, M., *A Comprehensive Introduction to Differential Geometry*, PUBLISH OR PERISH, Vol. 3, 1975, pp. 199-203.

Storti, D., et al., *A Tutorial on Implicit Solid Modeling*, THE MATHEMATICAL JOURNAL, Vol. 2, Issue 3, Summer 1992, pp. 70-78.

Sudhalkar, A., et al., *Continuous Skeletons of Discrete Objects* PROCEEDINGS OF THE SECOND SYMPOSIUM ON SOLID MODELING AND APPLICATIONS, J. Rossignac, J. Turner, and G. Allen, editors, AC Press, 1993, pp. 85-94.

Turkiyyah, G.M., et al., *An Accelerated Triangulation Method for Computing the Skeletons of Free-Form Solids Models*, COMPUTER-AIDED DESIGN, Vol. 29, No. 1, 1997, pp. 5-19.

Widmann, R., *An Efficient Algorithm for the Triangulation of Surfaces in $IR^3$*, Preprint, Colorado State University, Department of Mathmatics, Fort Collins, Colorado, USA, 1990.

Wyvill, G., et al., *Data Structure for Soft Objects*, THE VISUAL COMPUTER, 2(4), 1986, pp. 227-234.

Yuille, A., et al., *3D Symmetry-Curvature Duality Theorems*, COMPUTER VISION, GRAPHICS, IMAGE PROCESSING, 52, 1990, pp. 124-140. --

UNITED STATES PATENT AND TRADEMARK OFFICE
CERTIFICATE OF CORRECTION

PATENT NO. : 6,133,921
DATED : October 17, 2000
INVENTOR(S) : Turkiyyah et al.

It is certified that error appears in the above-identified patent and that said Letters Patent is hereby corrected as shown below:

Column 1,
Line 6, "is," should read -- is --

Column 6,
Line 64, "$TT_2$" should read -- $T_1T_2$ --

Signed and Sealed this

Fourth Day of December, 2001

Attest:

*Nicholas P. Godici*

NICHOLAS P. GODICI
*Attesting Officer*   *Acting Director of the United States Patent and Trademark Office*